United States Patent
Dohrn et al.

(10) Patent No.: US 11,853,956 B2
(45) Date of Patent: Dec. 26, 2023

(54) SYSTEM AND METHOD FOR ASSEMBLING A TRANSPORT

(71) Applicant: Hammel Companies Inc., Pittsburgh, PA (US)

(72) Inventors: Joseph Charles Dohrn, Woodland Park, CO (US); Matthew Paul McGowan, Winter Garden, FL (US)

(73) Assignee: Hammel Companies Inc., Pittsburgh, PA (US)

( * ) Notice: Subject to any disclaimer, the term of this patent is extended or adjusted under 35 U.S.C. 154(b) by 0 days.

(21) Appl. No.: 17/505,042

(22) Filed: Oct. 19, 2021

(65) Prior Publication Data

US 2023/0119088 A1     Apr. 20, 2023

(51) Int. Cl.
  *G06Q 10/08*    (2023.01)
  *G06Q 10/0834*  (2023.01)
  *G06Q 10/0833*  (2023.01)

(52) U.S. Cl.
  CPC ..... *G06Q 10/0834* (2013.01); *G06Q 10/0833* (2013.01)

(58) Field of Classification Search
  CPC . G06Q 10/08; G06Q 10/0833; G06Q 10/0834
  See application file for complete search history.

(56) References Cited

U.S. PATENT DOCUMENTS

| | | | |
|---|---|---|---|
| 7,765,120 B2 | 7/2010 | Yadappanavar et al. | |
| 8,572,001 B2 | 10/2013 | Hollis | |
| 10,824,982 B1* | 11/2020 | Whitehouse | G06Q 10/0832 |
| 11,055,655 B1* | 7/2021 | Neumann | G06Q 10/08355 |
| 2014/0149321 A1 | 5/2014 | Laumanns et al. | |
| 2016/0300186 A1 | 10/2016 | Scharaswak et al. | |
| 2019/0213500 A1 | 7/2019 | Chowdhary et al. | |
| 2020/0357089 A1 | 11/2020 | Mohr et al. | |
| 2021/0049548 A1* | 2/2021 | Grisz | G06N 20/00 |
| 2021/0073734 A1 | 3/2021 | Aman et al. | |
| 2021/0133655 A1 | 5/2021 | Suemitsu et al. | |

(Continued)

FOREIGN PATENT DOCUMENTS

WO     2014178055     11/2014

OTHER PUBLICATIONS

Hu, Jia. "Decision Support System Considering Risks in Combined Transport With a Case Study of Risk Management in Railway Transport." Universität Duisburg-Essen. 2018. (Year: 2018).*

(Continued)

*Primary Examiner* — Scott M Tungate
(74) *Attorney, Agent, or Firm* — CALDWELL INTELLECTUAL PROPERTY LAW (57) ABSTRACT

In an aspect, a system for assembling a transport is presented. A system includes a computing device. A computing device is configured to receive a transport request. A transport request comprises a recipient identifier. A computing device is configured to arrange a plurality of components into a transport assembly as a function of a recipient identifier. A computing device is configured to generate a transport label. A computing device is configured to input a transport label into a carrier optimization model. A computing device is configured to provide a recommendation of a carrier from a plurality of carriers as a function of a transport assembly and carrier optimization model.

20 Claims, 6 Drawing Sheets

(56) References Cited

U.S. PATENT DOCUMENTS

2021/0279811 A1\* 9/2021 Waltman ............... G06T 7/0002
2022/0261822 A1\* 8/2022 Yabe ...................... G06Q 10/08

OTHER PUBLICATIONS

Allen, J., Bektas, T., Cherrett, T., Friday, A., Mcleod, F., Piecyk, M., Piotrowska, M. and Zaltz Austwick, M., Enabling the freight traffic controller for collaborative multi-drop urban logistics: practical and theoretical challenges, Dec. 31, 2017.

\* cited by examiner

SYSTEM AND METHOD FOR ASSEMBLING A TRANSPORT

FIELD OF THE INVENTION

The present invention generally relates to the field of supply chain management. In particular, the present invention relates to a system and method for assembling a transport.

BACKGROUND

Modern supply chain systems transport different shipments that may have different categories. Tracking and recording each component of each different shipment can be time consuming and inefficient. As such, modern systems and methods of assembling a transport can be improved.

SUMMARY OF THE DISCLOSURE

In an aspect, a system for assembling a transport is presented. A system includes a computing device. A computing device is configured to receive a transport request. A transport request comprises a recipient identifier. A computing device is configured to communicate with a component database. A component database comprises component data. A computing device is configured to select a plurality of components from a component database as a function of a transport request. A computing device is configured to arrange a plurality of components into a transport assembly as a function of a recipient identifier. A computing device is configured to generate a transport label. A transport label is configured to apply to a transport assembly. A transport label is configured to identify each component of a transport assembly. A transport label is configured to associate a transport assembly with a recipient identifier. A computing device is configured to input a transport label into a carrier optimization model. A computing device is configured to provide a recommendation of a carrier from a plurality of carriers as a function of a transport assembly and carrier optimization model.

In an aspect, a method of assembling a transport is presented. A method includes receiving at a computing device a transport request comprising a recipient identifier. A method includes communicating at a computing device with a component database. A method includes selecting at a computing device a plurality of components from a component database as a function of a transport request. A method includes arranging at a computing device a plurality of components into a transport assembly as a function of a recipient identifier. A method includes generating a transport label. A method includes applying a transport label to a transport assembly. A method includes inputting a transport label into a carrier optimization model. A method includes providing a recommendation of a carrier from a plurality of carriers as a function of a transport assembly and carrier optimization model These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Described herein is a system for assembling a transport. A system may include a computing device. A computing device may be configured to receive a transport request. A transport request may include a recipient identifier. A computing device may be configured to communicate with a component database. A component database may include component data. A computing device may be configured to select a plurality of components from a component database as a function of a transport request. A computing device may be configured to arrange a plurality of components into a transport assembly as a function of a recipient identifier. A computing device may be configured to generate a transport label. A transport label may be configured to couple to a transport assembly. A transport label is configured to identify each component of a transport assembly. A transport label may be configured to associate a transport assembly with a recipient identifier. A computing device may be configured to input a transport label into a carrier optimization model. A computing device may be configured to provide a recommendation of a carrier from a plurality of carriers as a function of a transport assembly and carrier optimization model.

Described herein is a method of assembling a transport. A method may include receiving at a computing device a transport request comprising a recipient identifier. A method may include communicating at a computing device with a component database. A method may include selecting at a computing device a plurality of components from a component database as a function of a transport request. A method may include arranging at a computing device a plurality of components into a transport assembly as a function of a recipient identifier. A method may include generating a transport label. A method may include applying a transport label to a transport assembly. A method may include inputting a transport label into a carrier optimization model. A method may include providing a recommendation of a carrier from a plurality of carriers as a function of a transport assembly and carrier optimization model.

Figure 1:
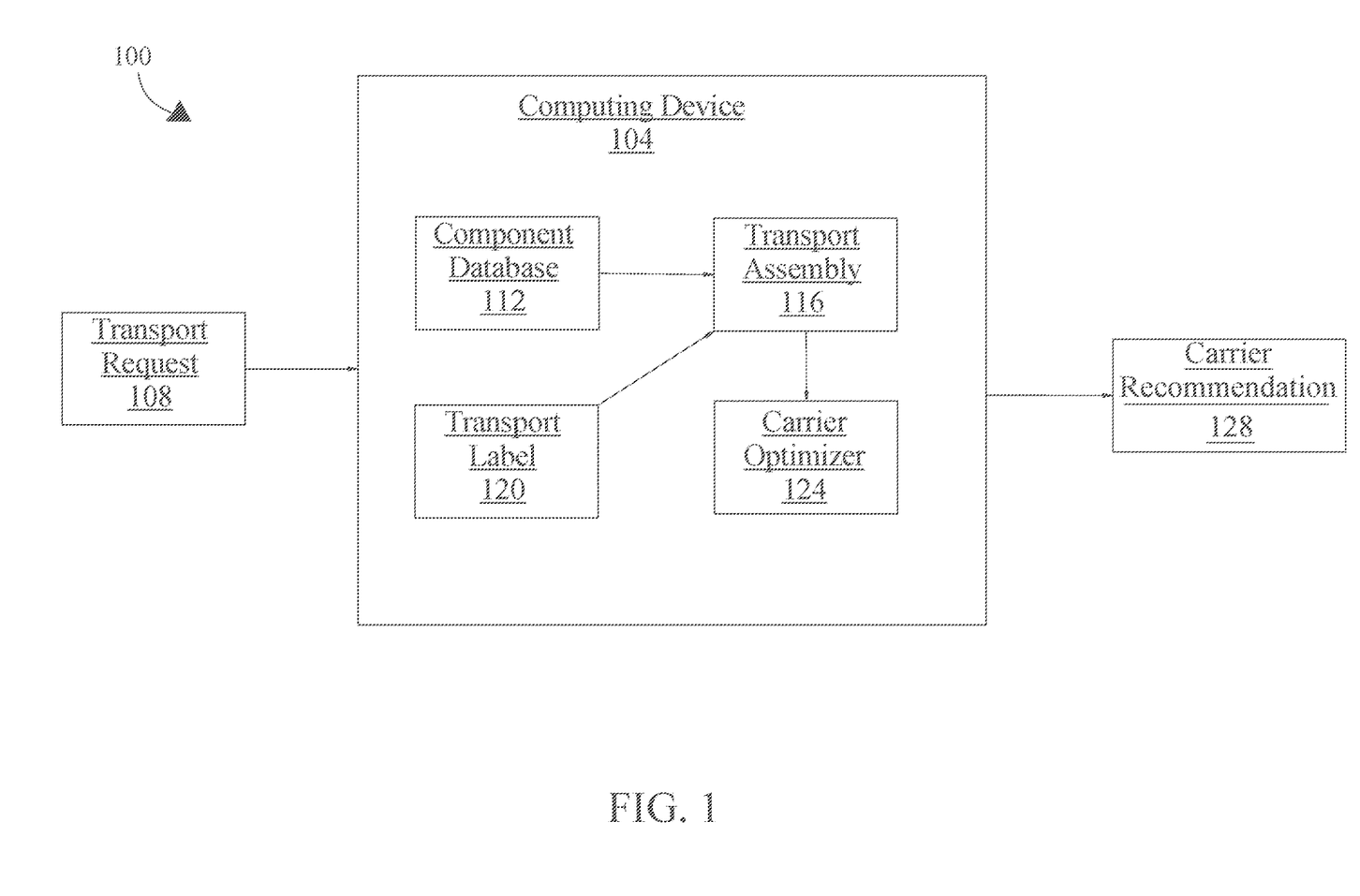
FIG. 1 is a block diagram of a system for assembling a transport.

Referring now to FIG. 1, a system 100 for carrier identification is presented. System 100 may include computing device 104. Computing device 104 may be utilized for connecting a computing device to one or more of a variety of networks, and one or more devices. Computing device 104 may include, but is not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. Computing device 104 may employ a wired and/or a wireless mode of communication. In general, any network topology may be used. Information (e.g., data, software etc.) may be communicated to and/or from a computer and/or a computing device through computing device 104. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device 104.

With continued reference to FIG. 1, computing device 104 may include a computing device that may be designed and/or configured to perform any method, method step, or sequence of method steps in any embodiment described in this disclosure, in any order and with any degree of repetition. For instance, a computing device of computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device of computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may receive transport request 108. A "transport request," as used in this disclosure, is an element of data including a request and/or demand for moving one or more components from one location to at least a second location. In some embodiments, transport request 108 may include transport parameters. "Transport parameters," as used in this disclosure, are any sets of data pertaining to a transport. In some embodiments, transport request 108 may include transport parameters such as, but not limited to, destinations, locations, times, dates, costs, type of transport, type of component, component quantities, and the like. In some embodiments, transport request 108 may be received from an external computing device, such as, but not limited to, a computer, laptop, desktop, smartphone, tablet, and the like. In some embodiments, transport request 108 may include a recipient identifier. A "recipient identifier," as used in this disclosure, is a unique combination of data that is associated with a transport recipient. A recipient identifier may include a digital signature, blockchain, unique object identifier, and the like. In some embodiments, a recipient identifier may include data pertaining to a transport recipient such as, but not limited to, component type, transport destination, transport type, preferred transport parameters, and the like. Data of a recipient identifier may be generated from, but is not limited to, a recipient identifier signal, database, and the like.

Still referring to FIG. 1, computing device 104 may include component database 112. Component database 112 may be implemented, without limitation, as a relational database, a key-value retrieval database such as a NOSQL database, or any other format or structure for use as a database that a person skilled in the art would recognize as suitable upon review of the entirety of this disclosure. Component database 112 may alternatively or additionally be implemented using a distributed data storage protocol and/or data structure, such as a distributed hash table or the like. Component database 112 may include a plurality of data entries and/or records as described above. Data entries in component database 112 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, component database 112 may include data of a plurality of components. A "component," as used in this disclosure, is data describing any object that is transported by one or more carriers. A component may include dimensions such as, but not limited to, height, length, width, thickness, volume, weight, and the like. In some embodiments, a component may belong to a component category. A component category may include categories such as, but not limited to, food, construction materials, electronics, consumer goods, vehicles, vehicle parts, furniture, and/or other categories. In some embodiments, a component may include a value. In some embodiments, component database 112 may include an estimated delivery cost of transporting a component. An estimated delivery cost may include a cost of transportation of a component. In some embodiments, an estimated delivery cost may include a combined cost of a delivery and transportation of a component. In some embodiments, component database 112 may include a location of a component, such as, but not limited to, an origination, destination, real time location, and the like.

Still referring to FIG. 1, computing device 104 may be configured to select one or more components of component database 112 as a function of transport request 108. Computing device 104 may group together components to form a transport assembly 116. In some embodiments, computing device 104 may group together components in component database 112. In other embodiments, computing device 104 may provide designations of components belonging to a same group. Designations may include, but are not limited to, digital signatures, labels, and the like. A "transport assembly" as used in this disclosure is data describing any grouping of items, as described by components, configured to be transported to a destination. In some embodiments, transport assembly 116 may be formed as a function of a transport criterion. A "transport criterion" as used in this disclosure is any constraint on a transport of one or more components. A transport criterion may include, but is not limited to, destination, transport time, cost, and the like. In some embodiments, transport assembly 116 may be arranged by a recipient identifier. For instance, transport assembly 116 may include a group of components that may share a destination of a recipient. A recipient identifier may identify a recipient destination. Transport assembly 116 may be linked to a recipient identifier through a recipient destination. In some embodiments, transport assembly 116 may include one or more components sharing a destination location. In some embodiments, transport assembly 116 may include two or more component types. A component type may include, but is not limited to, parcel, freight, expedited, hazardous, and the like. In some embodiments, transport assembly 116 may include a group of components having both a freight and parcel component type. A "freight component type" as used in this disclosure is a component including a grouping of components grouped as one component. A "parcel component type" as used in this disclosure is any individual component.

Still referring to FIG. 1, computing device 104 may include a component classifier. A "component classifier" as used in this disclosure is any process that categorizes component data into one or more groups. A component classifier may communicate with a transport database. A transport database may include a plurality of transport data, such as, but not limited to, types of components, categories of components, transport characteristics, and the like. A transport classifier may be trained with a set of training data correlating component data to categories of components. Training data may be received from previous iterations of a component classifier and/or received from one or more users on computing device 104. In some embodiments, a component classifier may be configured to categorize one or more components into one or more subcategories of component, such as, but not limited to, parcel, freight, hazardous, expedited, ground transport, sea transport, air transport, consumer goods, industrial supplies, and the like. In some embodiments, computing device 104 may use a component machine learning model. A component machine learning model may be trained with training data correlating a category of component to a component category. A component machine learning model may be trained on training data from previous processes. In some embodiments, training data may be received from one or more users. In some embodiments, a component machine learning model may be configured to input a component categorized from a component classifier, and output a recommended carrier for that component.

Still referring to FIG. 1, computing device 104 may generate transport label 120. A "transport label," as used in this disclosure, is a physical and/or digital identifier, and/or data for inclusion thereon, of a component or group of components that identifies the component or group of components. In some embodiments, transport label 120 may include a unique identification system. In some embodiments, a unique identification system may include a passive identification such as but not limited to a quick response (QR) code. A "QR" code as used in this disclosure is a type of matrix barcode with a machine-readable optical label that contains information about the item to which it is attached. A QR code may include black squares arranged in a square grid on a white background which may be read by an imaging device. A QR code may be configured to be processed using Reed-Solomon error correction. In other embodiments, a unique identification system may include a power source, computing device, and/or transmitting circuitry, and/or receiving circuitry. In some embodiments, a power source may include a battery cell. In some embodiments, a unique identification system may include a radio frequency identification (RFID) tag. An RFID tag may be configured to utilize electromagnetic fields to automatically identify and track objects. In some embodiments, an RFID system may include a radio transponder, radio receiver, and/or radio transmitter. In some embodiments, an RFID system may include a passive system. A passive RFID system may include an RFID tag that may be powered by energy from an RFID readers electromagnetic waves. In other embodiments, an RFID tag may be actively powered by a power source such as a battery. In other embodiments, a unique identification system may include a near field communication (NFC) tag. An NFC tag may include an antenna that may be configured to inductively couple with another antenna. Inductive coupling may include a configuration in which a change in current through one conductor wire induces a voltage across another conductive wire and vice versa. In some embodiments, an NFC system may be configured to communicate data between two electronic components within a distance of 4 cm or less. In some embodiments, an NFC system may be configured to communicate data between two electronic components over a distance of greater than 4 cm. In some embodiments, an NFC system may include a plurality of modes, such as but not limited to, card emulation, reader/write, and/or peer-to peer modes. In other embodiments, a unique identification system may include a unique identification number (UID). A UID may be configured to prevent any duplicate identity records of an entity. In some embodiments, a unique identification system may include a digital object identifier (DOI). A DOI may include a persistent identifier and/or handle used to identify objects uniquely, standardized by the International Organization for Standardization. A unique identification system may include utilize a hash function. In some embodiments, a unique identification system may include a form of security utilizing an immutable sequence listing.

Still referring to FIG. 1, in some embodiments, transport label 120 may be configured to identify transport assembly 116. Transport label 120 may identify transport assembly 116 from a plurality of transport assemblies. In some embodiments, there may be a plurality of transport assemblies 116. Each transport assembly of a plurality of transport assemblies may include a unique transport label 120. Each transport label of a plurality of transport assemblies may be configured to identify a transport assembly from other transport assemblies in a plurality of transport assemblies. In some embodiments, transport label 120 may be configured to track and/or monitor transport assembly 116. Tracking may occur through Bluetooth, Wi-Fi, GPS, Cellular Data, and/or other forms of wireless communication. In some embodiments, transport label 120 may be scannable by a carrier device such as, but not limited to, a smartphone, tablet, and the like. A carrier device may transmit data to computing device 104 pertaining to transport assembly 116. In some embodiments, transport label 120 may be configured to identify characteristics of components of transport assembly 116. Characteristics may include, but are not limited to, dimensions, weight, value, recipient identification, destination, category, and the like.

Still referring to FIG. 1, in some embodiments, computing device 104 may be configured to communicate with a carrier network. A "carrier" as used in this disclosure is an entity that transports an object between locations. An entity may include, but is not limited to, an individual, a vehicle, a group of individuals, a group of vehicles, and the like. A "carrier network" as used in this disclosure is a communication system of a plurality of carriers. In some embodiments, computing device 104 may be configured to receive carrier data from a carrier network. "Carrier data" as used in this disclosure is any information pertaining to one or more carriers. Carrier data may include a plurality of data of a plurality of carriers. Carrier data may include data regarding a carrier type. A carrier type may include, but is not limited to, a terrestrial carrier, an aerial carrier, and/or an aquatic carrier. In some embodiments, a carrier type may include but is not limited to, a plane, a drone, a helicopter, a boat, a ship, a car, a truck, a motorcycle, and the like. In some embodiments, a carrier type may include a motorized carrier. In other embodiments, a carrier type may include a non-motorized carrier. In some embodiments, a non-motorized carrier may include, but is not limited to, a bicycle, a skateboard, a scooter, and the like. In a non-limiting example, carrier datum 108 may include data of a carrier of a plurality of carriers showing one carrier may be utilizing a truck while another carrier may be utilizing a boat. In some embodiments, carrier data may include a transport path of a carrier of a plurality of carriers. A transport path of a carrier may include a path a carrier may take in the process of transporting a component. A transport path may include, but is not limited to, directions, estimated transport times, detour information, street addresses, GPS coordinates, and the like. In some embodiments, a transport path of a carrier of plurality of carriers 116 may include departure times, arrival times, fueling times, rest times, and the like. In some embodiments, a transport path of a carrier may include geographical coordinates, altitudes, longitudes, latitudes, and/or other locational datum. In some embodiments, a transport path may include a latitude, longitude, and/or altitude between two or more carriers. In some embodiments, carrier data may include a plurality of transport paths of a plurality of carriers. In some embodiments, carrier data may include a location of a carrier of a plurality of carriers. In some embodiments, a location of a carrier of a plurality of carriers may be updated in real time. "Real time," as used in this disclosure, is the actual time an action and/or event occurs. In some embodiments, computing device 104 may be configured to communicate transport data with a carrier network. Transport data may include, but is not limited to, transport types, transport times, transport destinations, transport costs, transport recipients, components, and the like.

Still referring to FIG. 1, computing device 104 may include carrier optimization model 124. Carrier optimization model 124 may include an optimization model. An optimization model may include one or more optimization criterion. An optimization criterion may include any description of a desired value or range of values for one or more attributes of a carrier; desired value or range of values may include a maximal or minimal value, a range between maximal or minimal values, or an instruction to maximize or minimize an attribute. As a non-limiting example, an optimization criterion may specify that a carrier should complete a transport as quickly as possible, for instance minimizing the transport time; an optimization criterion may cap a transport time, for instance specifying that it must be completed before a certain date or time, or within a certain period of time. An optimization criterion may alternatively request that transport time be greater than a certain value. An optimization criterion may specify one or more tolerances for precision in transport. An optimization criterion may specify one or more desired cost attributes for the transport. In an embodiment, at least an optimization criterion may assign weights to different attributes or values associated with attributes; weights, as used herein, may be multipliers or other scalar numbers reflecting a relative importance of a particular attribute or value. One or more weights may be expressions of value to a supplier of a particular outcome, attribute value, or other facet of a transportation process; value may be expressed, as a non-limiting example, in remunerative form, such as a quantity of a medium of exchange, a monetary unit, or the like. As a non-limiting example, minimization of transport time may be multiplied by a first weight, while tolerance above a certain value may be multiplied by a second weight. Optimization criterion may be combined in weighted or unweighted combinations into a function reflecting an overall outcome desired by a user; function may be a cost function to be minimized and/or maximized. Function may be defined by reference to transport constraints and/or weighted aggregation thereof as provided by a plurality of remote computing devices; for instance, a cost function combining optimization criterion may seek to minimize or maximize a function of transportation constraints.

Still referring to FIG. 1, computing device 104 may use carrier optimization model 124 to compare a first group of carriers to a second group of carriers. Generation of carrier optimization model 124 may include generation of a function to score and weight factors to achieve a process score for each feasible pairing. In some embodiments, pairings may be scored in a matrix for optimization, where columns represent components and rows represent carriers potentially paired therewith; each cell of such a matrix may represent a score of a pairing of the corresponding transport assembly to the corresponding carrier. In some embodiments, assigning a predicted process that optimizes the objective function includes performing a greedy algorithm process. A "greedy algorithm" is defined as an algorithm that selects locally optimal choices, which may or may not generate a globally optimal solution. For instance, carrier optimization model 124 may select pairings so that scores associated therewith are the best score for each transport and/or for each transport assembly. In such an example, optimization may determine the combination of carriers such that each object pairing includes the highest score possible.

Still referring to FIG. 1, carrier optimization model 124 may be formulated as a linear objective function. Carrier optimization model 124 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all transport assemblies r, S is a set of all carriers s, $c_{rs}$ is a score of a pairing of a given transport assembly with a given carrier, and $x_{rs}$ is 1 if a transport assembly r is paired with a carrier s, and 0 otherwise. Continuing the example, constraints may specify that each transport assembly is assigned to only one carrier, and each carrier is assigned only one transport assembly. Transport assemblies may include transport assemblies as described above. Sets of transport assemblies may be optimized for a maximum score combination of all generated carriers. In various embodiments, carrier optimization model 124 may determine a combination of transport assemblies that maximizes a total score subject to a constraint that all transport assemblies are paired to exactly one carrier. Not all carriers may receive a transport assembly pairing since each carrier may only transport one transport assembly. A mathematical solver may be implemented to solve for the set of feasible pairings that maximizes the sum of scores across all pairings; mathematical solver may be implemented on computing device 104 and/or another device in system 100, and/or may be implemented on third-party solver. In some embodiments, a machine-learning model may be used to generate scores, parameters, and/or constraints. A machine-learning model may be trained on training data correlating transport assemblies and carrier pairings to scores. A machine-learning model may be configured to input transport assemblies and carrier pairings and output scores. A machine-learning model may be trained on training data correlating transport requests to one or more transport parameters. A machine-learning model may be configured to input a plurality of transport requests and output one or more transport parameters such as, but not limited to, destinations, cost ranges, transport recipient preferences, and the like. A machine-learning model may be trained on training data correlating transport requests to one or more transport constraints. A machine-learning model may be configured to input a plurality of transport requests and output one or more transport constraints such as, but not limited to, time constraints, resource constraints, distance constraints, and the like.

With continued reference to FIG. 1, carrier optimization model 124 may include minimizing a loss function, where a "loss function" is an expression an output of which an optimization model minimizes to generate an optimal result. As a non-limiting example, carrier optimization model 124 may assign variables relating to a set of parameters, which may correspond to score transport assemblies as described above, calculate an output of mathematical expression using the variables, and select a pairing that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs. Objectives represented in an objective function and/or loss function may include minimization of transportation times. Objectives may include minimization of costs of transporting a transport assembly. Objectives may include minimization of carriers and/or resources used. Objectives may include minimization of a difference between a selected transport path and an actual transport path taken. Objectives may include minimization of carrier cost.

Still referring to FIG. 1, carrier optimization model 124 may be configured to optimize a selection of a carrier. In some embodiments, carrier optimization model 124 may receive a plurality of carrier data. A plurality of carrier data may include data of an availability of one or more carriers. Carrier optimization model 124 may receive transport parameters from transport request 108. In some embodiments, computing device 104 may utilize carrier optimization model 124 to generate carrier recommendation 128. Carrier recommendation 128 may be generated by a plurality of factors including, but not limited to, transport type, transport distance, cost, transport assembly, and the like. In some embodiments, carrier recommendation 128 may include two or more carriers of differing carrier types. In some embodiments, carrier recommendation 128 may include one or more carriers of identical carrier types.

Figure 2:
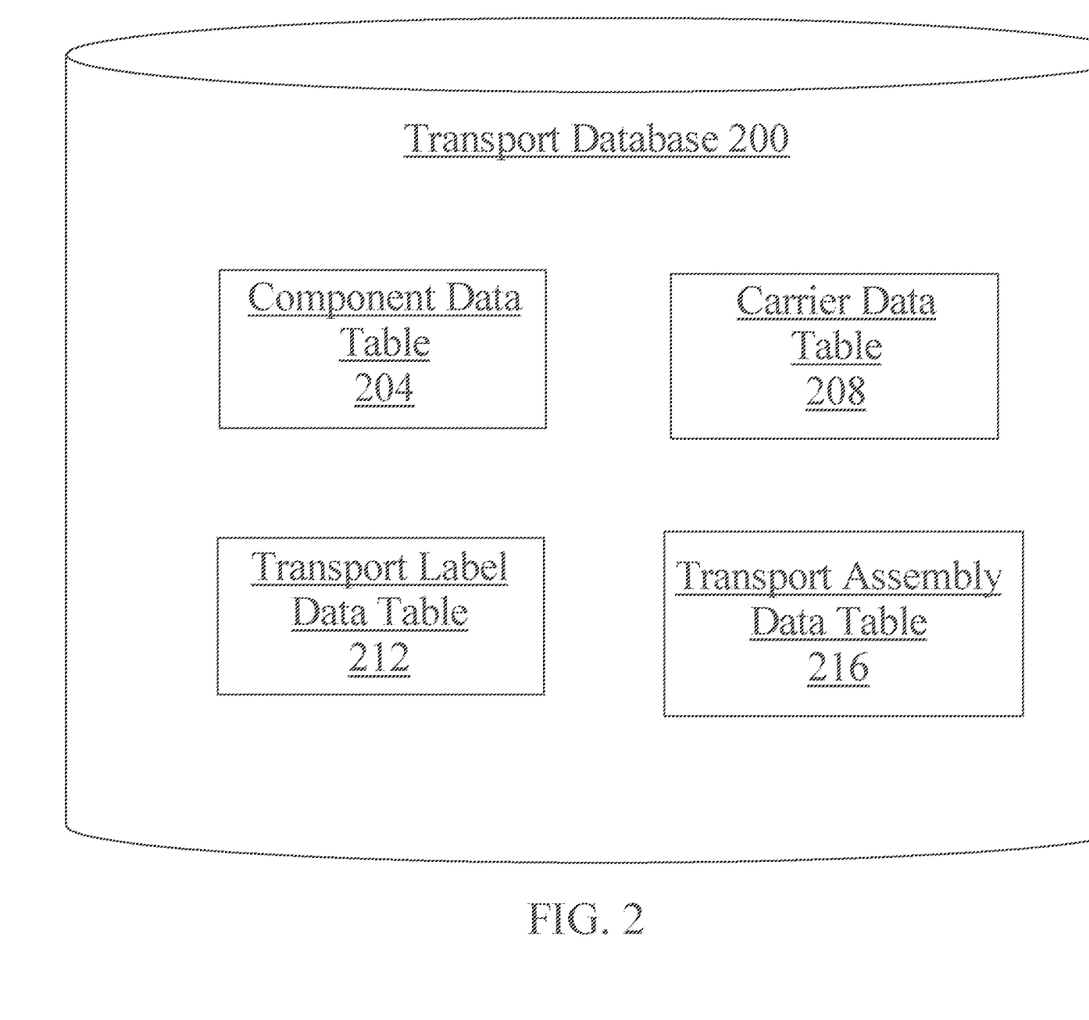
FIG. 2 is a block diagram of an exemplary embodiment of a transport database.

Now referring to FIG. 2, transport database 200 is shown. Transport database 200 may be implemented, without limitation, as a relational database, a key-value retrieval database such as a NOSQL database, or any other format or structure for use as a database that a person skilled in the art would recognize as suitable upon review of the entirety of this disclosure. Transport database 200 may alternatively or additionally be implemented using a distributed data storage protocol and/or data structure, such as a distributed hash table or the like. Transport database 200 may include a plurality of data entries and/or records as described above. Data entries in transport database 200 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 2, transport database 200 may include component data table 204. Component data table 204 may include data of a plurality of components. In some embodiments, component data table 204 may include data about a component type. A component type may include, but is not limited to, consumer goods, industrial supplies, electronics, construction materials, and the like. Component data table 204 may include a plurality of component types of a plurality of components. Component data table 204 may include data about a component dimension. A component dimension may include, but is not limited to, height, length, width, thickness, volume, and the like. Component data table 204 may include a plurality of component dimensions of a plurality of components. In some embodiments, component data table 204 may include a component category. A component category may include, but is not limited to, freight, parcel, hazardous, non-hazardous, expedited transport, standard transport and the like. In some embodiments, component data table 204 may include a plurality of component categories of a plurality of components. In some embodiments, component data table 204 may include a component status. A component status may include, but is not limited to, ready for transport, in preparation for transport, on hold, transported, and the like. In some embodiments, component data table 204 may include a plurality of component statuses of a plurality of components.

Still referring to FIG. 2, transport database 200 may include carrier data table 208. Carrier data table 208 may include data of a plurality of carriers. Carrier data table 208 may include, but is not limited to, carrier types, carrier availability, carrier costs, and the like. In some embodiments, carrier data table 208 may include carrier performance data. "Carrier performance data" as used in this disclosure is information of an ideal transport compared to a completed transport of a carrier. Carrier performance data may include data about a historical efficiency of a carrier. In some embodiments, carrier performance data may be subcategorized into subcategories of performance data. Carrier performance data may be subcategorized into specific transport types, transport assemblies, and the like.

Still referring to FIG. 2, transport database 200 may include transport label data table 212. Transport label data table 212 may include data of previously created transport labels. In some embodiments, transport label data table 212 may include unique system identifiers corresponding to transport labels. In some embodiments, transport label data table 212 may include data of transport assemblies corresponding to transport labels. Transport label data table 212 may store transport labels in a first column and corresponding transport assemblies in a second column. In some embodiments, transport label data table 212 may include recipient identifiers corresponding to transport labels. Transport label data table 212 may include data of transport labels such as, but not limited to, component characteristics, destinations, transport assembly identification, and the like. "Component characteristics" as used in this disclosure are any qualities, traits, and/or attributes associated with an object or group of objects.

Still referring to FIG. 2, transport database 200 may include transport assembly data table 216. Transport assembly data table 216 may include data of a plurality of transport assemblies such as, but not limited to, component information, component characteristics, recipient identification, destinations, transport status, and the like.

Figure 3:
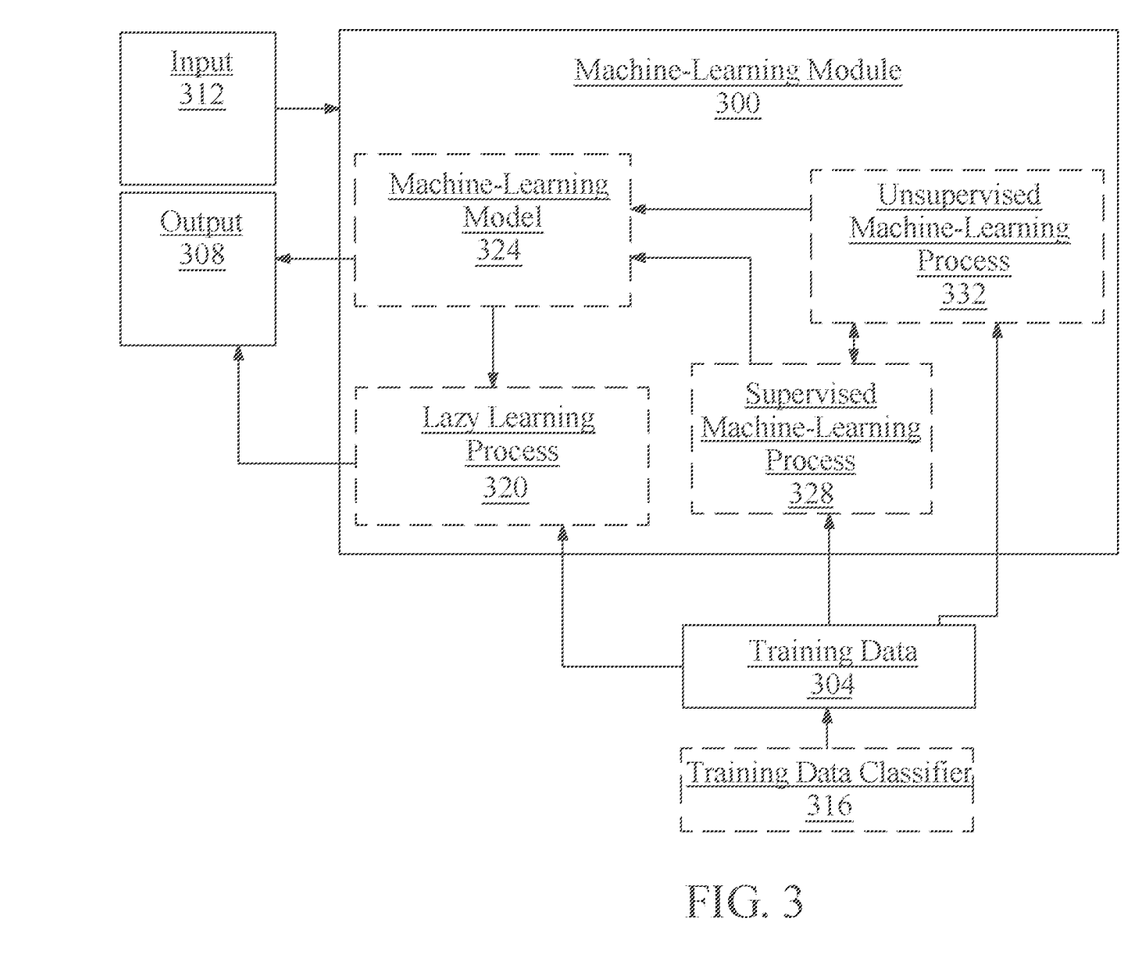
FIG. 3 is a block diagram of a machine learning system.

Referring now to FIG. 3, an exemplary embodiment of a machine-learning module 300 that may perform one or more machine-learning processes as described in this disclosure is illustrated. A computing device may utilize machine-learning module 300 to predict a transport path of a carrier group, carrier group performance, carrier group remittance, and type of carrier based on a component category. In some embodiments, a computing device may utilize machine-learning module 300 that may be trained with data from computing device database 200. Machine-learning module 300 may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Training data 304 may be received and/or collected from a computing device database. In other embodiments, training data 304 may be received from a user input. Training data 304 may be received from previous iterations of training data vectors. In some embodiments, training data 304 may be received by one or more remote devices that at least correlate carrier data and transport data. In some embodiments, training data 304 may correlate component data and carrier data. In other embodiments, training data 304 may correlate carrier data and remittance data. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example carrier data and/or component data may be inputs, wherein an output may be a transport path of a component.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or transport component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to sub-categories of transport data such as location, direction, speed, transport times, and the like thereof.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include carrier data and/or transport component data as described above as inputs, transport paths as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 4:
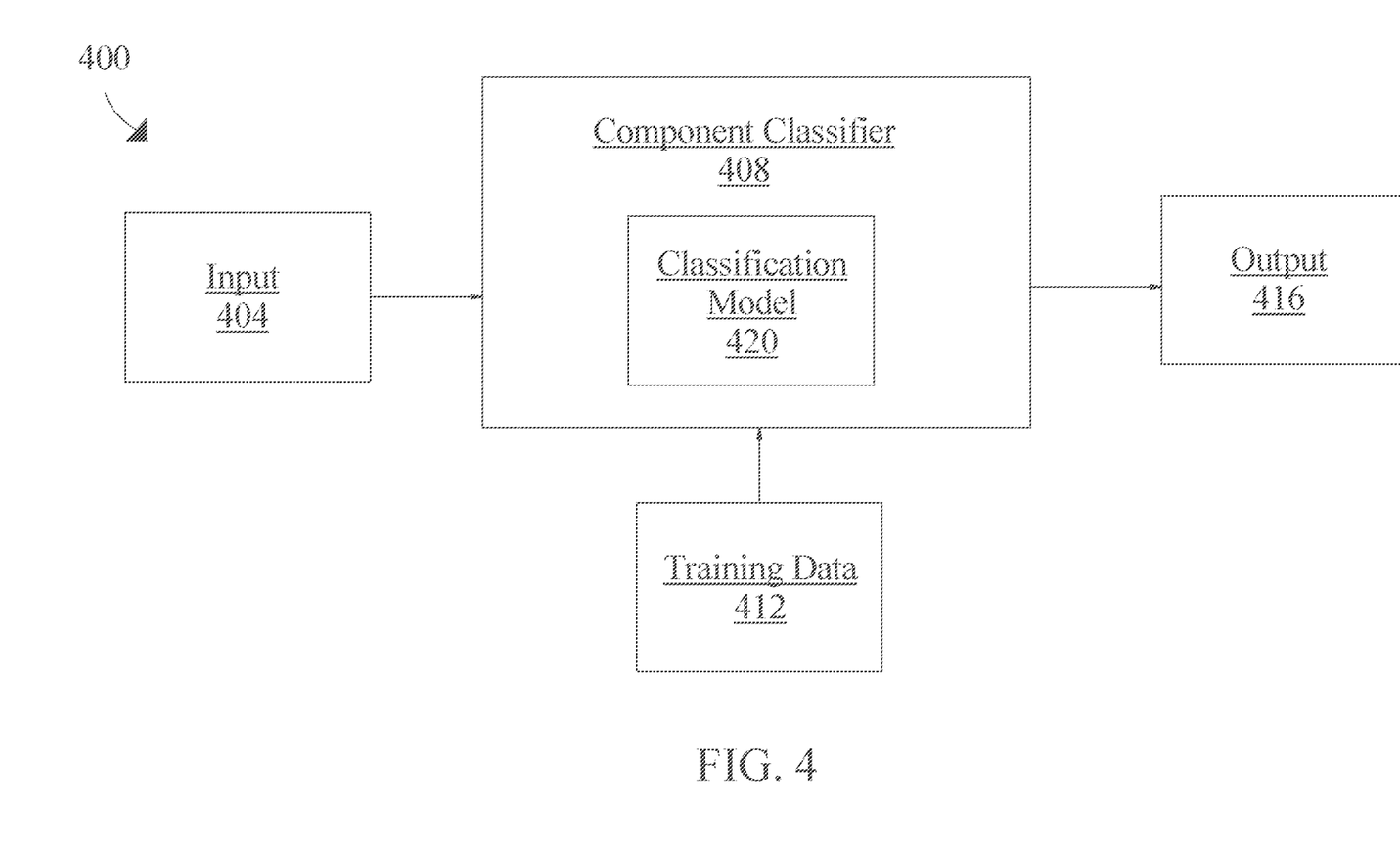
FIG. 4 is a block diagram of a component classification system.

Referring now to FIG. 4, component classification system 400 is presented. Component classification system 400 may include component classifier 408. A "component classifier" as used in this disclosure is any process that categorizes component data into one or more groups. Component classifier 408 may communicate with a transport database. A transport database may include a plurality of transport data, such as, but not limited to, types of components, categories of components, transport characteristics, and the like. Component classifier 408 may include classification model 420. Classification model 420 may include any classification model and/or algorithm described throughout this disclosure. Component classifier 408 may be trained with training data 412. Training data 412 may include, but is not limited to, transport data, component data, and the like. Training data 412 may include data correlating component data to categories of components. Training data 412 may be received from previous iterations of component classifier 408 and/or received from one or more users on computing device 104. In some embodiments, component classifier 408 may be configured to receive input 404. Input 404 may include, but is not limited to, component data. In some embodiments, component classifier 408 may be configured to classify input 404. Component classifier 408 may be configured to generate output 416. Output 416 may include one or more components categorized into one or more subcategories of component, such as, but not limited to, parcel, freight, hazardous, expedited, ground transport, sea transport, air transport, consumer goods, industrial supplies, and the like. In some embodiments, training data 412 may include data from input 404 and/or output 416. In a non-limiting example, component classifier 408 may receive input 404 that may include component data of a sneaker. Component classifier 408 may generate output 416 that may categorize sneaker component data into a parcel component type.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
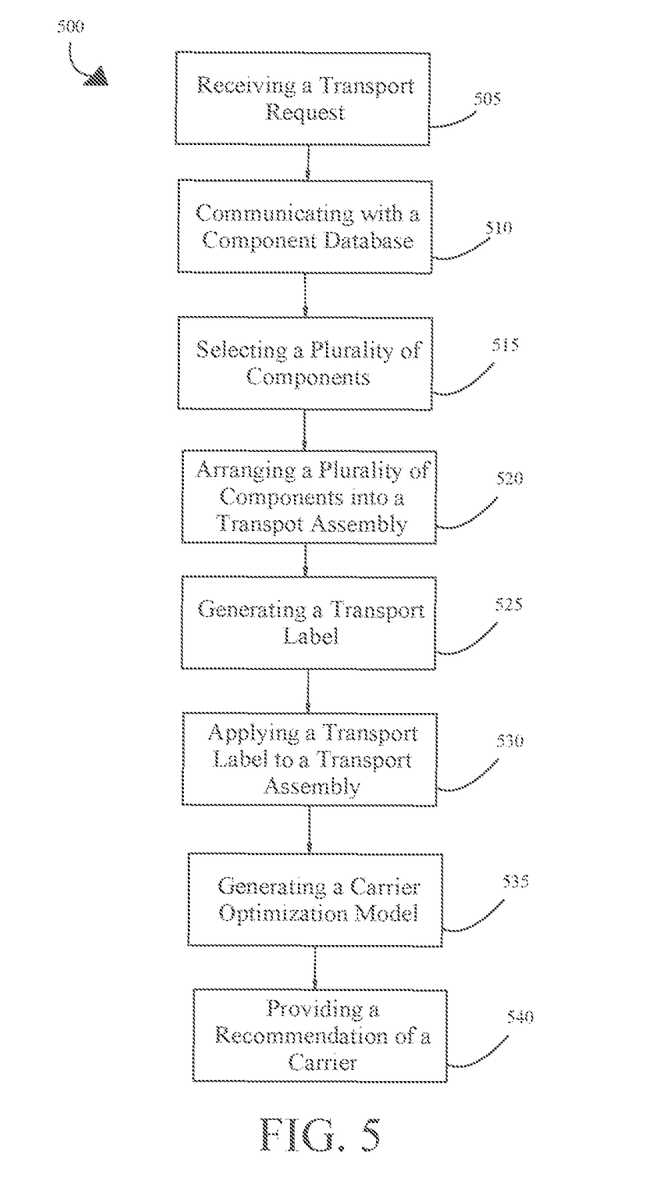
FIG. 5 is a block diagram illustrating an exemplary embodiment of a method of assembling a transport.

Now referring to FIG. 5, method 500 for assembling a transport is presented. At step 505, method 500 includes receiving a transport request. A transport request may be received from an external computing device such as, but not limited to, a smartphone, tablet, desktop, laptop, and the like. A transport request may include transport data. Transport data may include transport times, locations, destinations, component data, and the like. In some embodiments, a transport request may include a recipient identifier. In some embodiments, a recipient identifier may include a destination. This step may be implemented, without limitation, as described in FIGS. 1-3.

Still referring to FIG. 5, at step 510, method 500 includes communicating with a component database. Communicating with a component database may include querying a component database for specific components. In some embodiments, a component database may include component data of a plurality of components. In some embodiments, a computing device may communicate transport data to a carrier network. Transport data may include, but is not limited to, transport types, components, component types, transport times, transport destinations, transport dates, and the like. This step may be implemented, without limitation, as described in FIGS. 1-3.

Still referring to FIG. 5, at step 515, method 500 includes selecting a plurality of components. A plurality of components may be selected from a component database. Components may be selected as a function of a transport request. In some embodiments, components may be selected by a destination, component type, recipient identifier, and the like. In some embodiments, a plurality of components may be selected as a function of a component classification model. A component classification model may be configured to classify a component. This step may be implemented, without limitation, as described in FIGS. 1-3.

Still referring to FIG. 5, at step 520, method 500 includes arranging a plurality of components into a transport assembly. A plurality of components may include a plurality of selected components. In some embodiments, a transport assembly may include a group of selected components. In some embodiments, a transport assembly may include a group of components to be transported to a same recipient. In some embodiments, a transport assembly may include two or more components having a differing component type. In some embodiments, a transport assembly may include two or more components having a same component type. This step may be implemented, without limitation, as described in FIGS. 1-3.

Still referring to FIG. 5, at step 525, method 500 includes generating a transport label. A transport label may include a unique identification system and/or a unique identifier. In some embodiments, a transport label may be configured to associate a transport assembly with a recipient identifier. A transport label may be configured to identify each component of a transport assembly. In some embodiments, a transport label may be configured to identify component characteristics of a transport assembly. This step may be implemented, without limitation, as described in FIGS. 1-3.

Still referring to FIG. 5, at step 530, method 500 includes applying a transport label to a transport assembly. A transport label may be digitally applied to a transport assembly in a computing system. In some embodiments, a transport label may include a physical object such as, but not limited to, a QR code, RFID chip, NFC chip, and the like. This step may be implemented, without limitation, as described in FIGS. 1-3.

Still referring to FIG. 5, at step 535, method 500 includes generating a carrier optimization model. A carrier optimization model may be configured to maximize or minimize an optimization criterion. In some embodiments, a carrier optimization model may be configured to select a best carrier of a plurality of carriers. In some embodiments, a carrier optimization model may be configured to select two or more carriers having a different carrier type. In some embodiments, a carrier optimization model may be configured to select two or more carriers with a same carrier type. This step may be implemented, without limitation, as described in FIGS. 1-3.

Still referring to FIG. 5, at step 540, method 500 includes providing a recommendation of a carrier. A recommendation of a carrier may include a selected carrier from a carrier optimization model. In some embodiments, providing a recommendation may include displaying a recommendation on a graphical user interface. In some embodiments, a user may accept or reject a recommended carrier. A new recommendation may be provided to a user as a function of a user input. In some embodiments, a transport assembly may be monitored by a computing device. In some embodiments, a transport assembly may be monitored through a transport label. In some embodiments, monitoring may include, but is not limited to, determining a transport assembly location, transport status, and the like. This step may be implemented, without limitation, as described in FIGS. 1-3.

Figure 6:
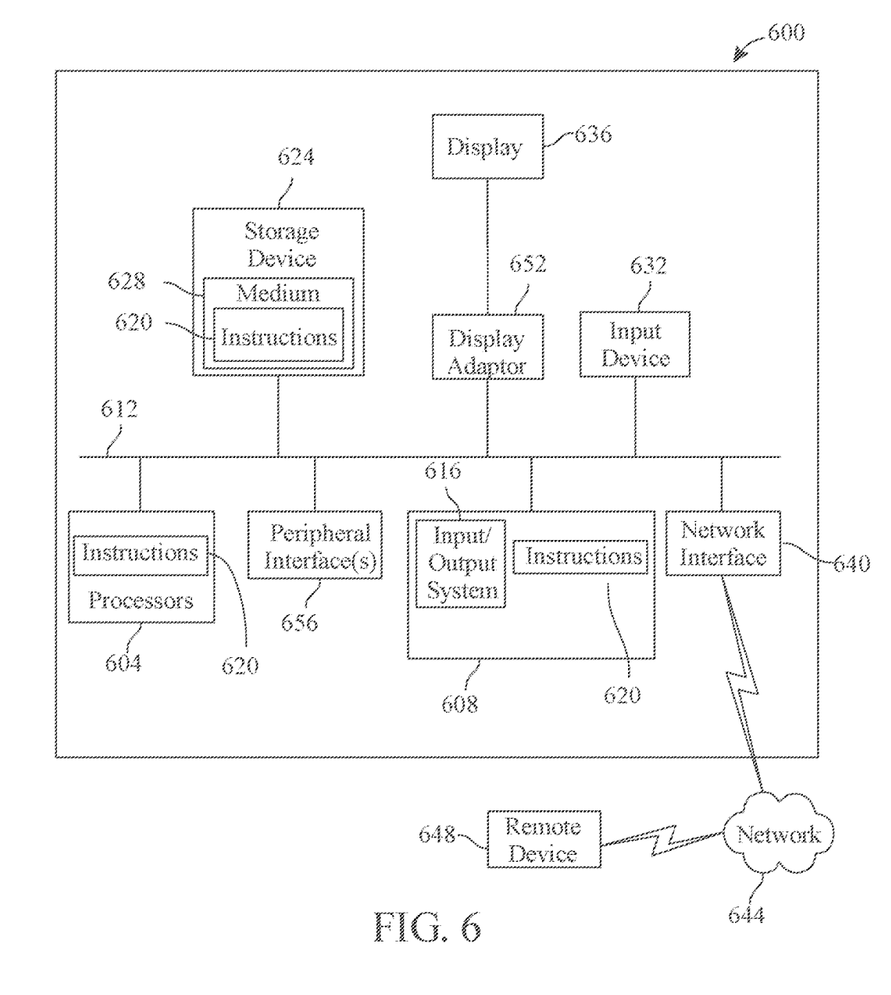
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Still referring to FIG. 6, processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 6, memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Still referring to FIG. 6, computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Still referring to FIG. 6, computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display device 636, discussed further below. Input device 632 may be utilized as a user selection device for selecting one or more graphical representations in a graphical interface as described above.

Still referring to FIG. 6, a user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Still referring to FIG. 6, computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for assembling a transport, comprising:
a computing device configured to:

receive a transport request, wherein the transport request comprises a recipient identifier;

select a plurality of components from a component database as a function of the transport request;

generate training data using data generated by previous iterations of a component classification model, wherein the component classification model comprises a neural network classifier that utilizes a Levenberg-Marquardt algorithm to adjust the weights between nodes in adjacent layers to produce desired values at the output nodes;

train the component classification model using the training data correlating component data to categories of components including subcategories of components, wherein the categories of components includes a food category and a construction material category, wherein the subcategories of components includes an expedited subcategory and a hazardous sub category;

classify at least a component of the plurality of components as a function of the trained component classification model, wherein the at least a component is provided to the trained component classification model as an input to output a category and subcategory, and wherein the component classification is performed using a least squares support vector machine to minimize the square of the difference between a vector-space distance norm classifying at least one of the expedited subcategory and the hazardous subcategory to a component type indicated by the input component data;

arrange the plurality of components into a transport assembly as a function of the recipient identifier and the classification of the at least a component;

generate a transport label, wherein the transport label is configured to:
identify each component of the transport assembly; and
associate the transport assembly with the recipient identifier;

apply the transport label to the transport assembly;

input the transport label into a carrier optimization model configured to compare, a first group of carriers to a second group of carriers, wherein the comparison comprises:
generating a linear objective function configured to score a pairing of the first group of carriers and the second group of carriers; and
solving the linear objective function as a function of the transport assembly using a linear program; and provide a recommendation of a carrier from the plurality of carriers as a function of the transport assembly and the carrier optimization model.

2. The system of claim 1, wherein the carrier optimization model includes an optimization criterion.

3. The system of claim 1, wherein the transport assembly includes at least two component types that are not identical.

4. The system of claim 1, wherein the recipient identifier includes a destination.

5. The system of claim 1, wherein each carrier of the plurality of carriers comprises a carrier type, wherein the carrier type of each carrier is not identical.

6. The system of claim 1, wherein the transport label includes a unique identifier.

7. The system of claim 6, wherein the unique identifier comprises component characteristics of each component of the transport assembly.

8. The system of claim 1, wherein the computing device is configured to monitor a transport of the transport assembly.

9. The system of claim 1, wherein the computing device is further configured to transmit transport data to a carrier network.

10. The system of claim 1, wherein the computing device is further configured to:
display the recommendation of a carrier to a user on a graphical user interface;
receive a response from a user accepting or rejecting the recommendation of a carrier; and
provide the user with a new recommendation of a carrier as a function of a user input.

11. A method of assembling a transport, comprising:
receiving, at a computing device, a transport request comprising a recipient identifier;
communicating with a component database;
selecting, at the computing device, a plurality of components from a component database as a function of the transport request;
generating, at the computing device, training data using data generated by previous iterations of a component classification model, wherein the component classification model comprises a neural network classifier that utilizes a Levenberg-Marquardt algorithm to adjust the weights between nodes in adjacent layers to produce desired values at the output nodes;
training, at the computing device, the component classification model using the training data correlating component data to categories of components including subcategories of components, wherein the categories of components includes a food category and a construction material category, wherein the subcategories of components includes an expedited subcategory and a hazardous sub category;
classifying, at the computing device, at least a component of the plurality of components as a function of the trained component classification model, wherein the at least a component is provided to the trained component classification model as an input to output a category and subcategory, and wherein the component classification is performed using a least squares support vector machine to minimize the square of the difference between a vector-space distance norm classifying at least one of the expedited subcategory and the hazardous subcategory to a component type indicated by the input component data;
arranging, at the computing device, the plurality of components into a transport assembly as a function of the recipient identifier and the classification of the at least a component;
generating, at the computing device, a transport label;
applying, at the computing device, the transport label to the transport assembly;
inputting, at the computing device, the transport label into a carrier optimization model configured to compare a first group of carriers to a second group of carriers, wherein the comparison comprises:
generating a linear objective function configured to score a pairing of the first group of carriers and the second group of carriers; and
solving the linear objective function as a function of the transport assembly using a linear program; and providing, at the computing device, a recommendation of a carrier from the plurality of carriers as a function of the transport assembly and the carrier optimization model.

12. The method of claim 11, wherein the carrier optimization model includes an optimization criterion.

13. The method of claim 11, wherein the transport assembly includes at least two different component types that are not identical.

14. The method of claim 11, wherein the recipient identifier includes a destination.

15. The method of claim 11, wherein each carrier of the plurality of carriers comprises a carrier type, wherein the carrier type of each carrier is not identical.

16. The method of claim 11, wherein the transport label includes a unique identifier.

17. The method of claim 16, wherein the unique identifier comprises component characteristics of each component of the transport assembly.

18. The method of claim 11, wherein the computing device is configured to monitor a transport of the transport assembly.

19. The method of claim 11, wherein the computing device is further configured to communicate transport data to a carrier network.

20. The method of claim 11, further comprising:

displaying, at the computing device, the recommendation of a carrier to a user on a graphical user interface;

receiving, at the computing device, a response from a user accepting or rejecting the recommendation of a carrier; and providing, at the computing device, the user with a new recommendation of a carrier as a function of a user input.

* * * * *